United States Patent
Chrow

[11] 3,805,848
[45] Apr. 23, 1974

[54] HOSE CONSTRUCTION
[75] Inventor: Albert E. Chrow, Bentleyville, Ohio
[73] Assignee: Parker-Hannifin Corporation, Cleveland, Ohio
[22] Filed: Dec. 22, 1971
[21] Appl. No.: 210,847

[52] U.S. Cl............ 138/137, 138/144, 161/75, 161/190, 161/227, 161/231, 161/256, 156/161, 156/172, 117/138.8 N
[51] Int. Cl............................... F16i 9/14
[58] Field of Search............ 161/190, 227, 75, 231, 161/256; 156/161, 172; 138/125, 141, 137, 144; 117/138.8 N

[56] References Cited
UNITED STATES PATENTS

| | | | |
|---|---|---|---|
| 2,933,417 | 4/1960 | McIntyre | 117/138.8 N |
| 2,984,594 | 5/1961 | Runton | 161/231 |
| 3,062,241 | 11/1962 | Brumbach | 138/125 |
| 3,116,760 | 1/1964 | Matthews | 138/125 |
| 3,332,447 | 7/1967 | Holmgren | 138/125 |
| 3,334,165 | 8/1967 | Koch | 264/135 |
| 3,579,416 | 5/1971 | Schrenk | 161/256 |
| 3,585,059 | 6/1971 | James | 161/190 |
| 3,606,958 | 9/1971 | Coffman | 161/227 |
| 3,661,677 | 5/1972 | Wang | 161/256 |

Primary Examiner—George F. Lesmes
Assistant Examiner—Ellis P. Robinson
Attorney, Agent, or Firm—John N. Wolfram

[57] ABSTRACT

A hose construction particularly suitable for Freon service in refrigeration systems, the hose comprising a core tube of polyamide coated with vinylidene chloride polymer, a tensioned reinforcement and a sheath, the reinforcement being bonded to both the coating and the sheath.

4 Claims, 2 Drawing Figures

HOSE CONSTRUCTION

BACKGROUND OF THE INVENTION

Hoses of synthetic plastic materials are desirable for Freon service in refrigeration and air conditioning systems in order to obtain high strength, good flexibility, ability to bend to short radii without kinking, small outside diameter in relation to inside diameter, and for being impervious to the fluids involved. However, hoses of conventional synthetic materials, such as Nylon, polyvinyl chloride polymer, and the like, although having characteristics suitable for the above purposes, are in most cases permeable to water vapor, which makes them undesirable for refrigeration service. In the past, attempts have been made for solving the water vapor permeability problem by applying a covering of thin sheet material over the core tube. Such sheet material has been wrapped about the tube so as to result in a longitudinal seam, or has been spirally wrapped with a resulting spiral seam, and has been manufactured from such materials as Mylar, Teflon, Compar and Polypropylene.

The sheet material is not only difficult to apply to the core tube, but may also present problems in adhering to the core tube or surrounding reinforcement and in keeping the seam tight when the core tube expands and contracts during pressure variations of when the hose is bent or flexed.

BRIEF SUMMARY OF THE INVENTION

This invention provides a hose for freon service comprising a flexible polyamide core tube that is impervious to Freon, a coating of vinylidene chloride polymer (Saran) on the outer surface of the core tube to serve as a water barrier, a reinforcing layer of fibrous synthetic strands of a material such as Nylon, Dacron, or the like, and an outer sheath of a flexible and abrasion resistant material such as polyamide, polyester, polyurethane or the like.

The preferred form of the vinylidene chloride polymer for application as a coating to the core tube is a water solution such as a latex. However, other liquid forms of vinylidene chloride polymer such as lacquers, paints, varnish, organisols, or the like may also be used.

It has been found that if applied at temperatures between 150°F and 400° and about 0.0005 inch in thickness the vinylidene chloride polymer will adhere to the outer surfaces of the polyamide core tube without the necessity of using adhesives.

The layer of fibrous reinforcement strands may or may not be bonded to the vinylidene chloride polymer coating and/or to the sheath with an adhesive or other means, depending upon the desired characteristics of the finished hose. It is desirable, in most cases, to bond the reinforcing strands both to the vinylidene chloride polymer coating and to the sheath because the hose can then be bent to small radii without collapse or kinking.

It has been found that polyester isocyanate type adhesives are exceptionally suitable for bonding polyamide reinforcement to the vinylidene chloride polymer coating. Amine cured epoxies provide a good bond between the fibrous reinforcement and the sheath.

DESCRIPTION

Figure 1:
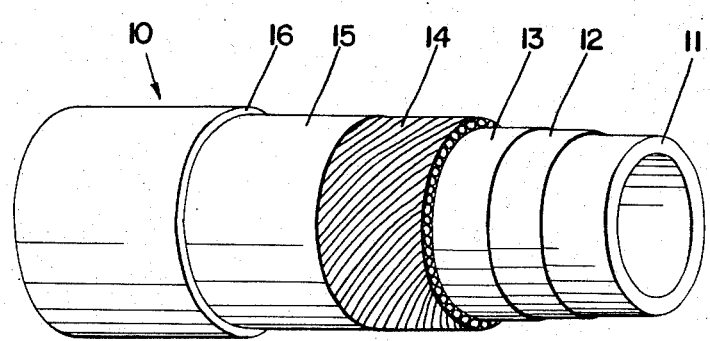
FIG. 1 is a view of a hose in accordance with this invention.

Hose 10 includes a polyamide core tube 11 covered by a coating of vinylidene chloride polymer, one or more layers of tensioned fibrous reinforcement 14 such as Nylon, Dacron or other synthetic or natural material, and a sheath 16 of polyamide. Preferably, the fibrous reinforcement 14 is bonded to the vinylidene chloride polymer coating 12 with polyester isocyanate adhesive 13 and to the sheath 16 with an amine cured epoxy 15, but other adhesives may be suitable.

The core tube 11 is preferably of a plasticized and heat stabilized polyamide, such as plasticized 6/6/6 copolymers marketed under the trade name of Zytel 91 or 91-A by the E. I. DuPont de Nemours Corporation, and which is substantially impermeable to freon. If, however, freon permeation loss can be tolerated, then such materials an Nylon 11, Nylon 12, Nylon 8, or specialty polyesters or polyurethane or the like can be used for the core tube.

Generally, the materials that lend themselves to core tube applications because of low permeability by Freon are ineffective as a barrier against water vapor penetration into the hose from the surrounding environment. To prevent absorption of water into the core tube from external sources, a coating 12 of vinylidene chloride polymer is applied to the core tube. This coating is seamless and provides an effective water barrier that does not crack or open up when the hose is subjected to bending or flexing under a broad range of operating temperatures; such as from −20°F to +200°F.

Figure 2:
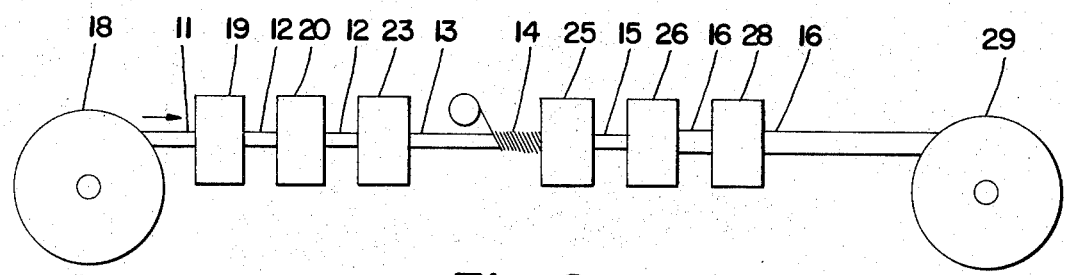
FIG. 2 is a schematic view showing one method of applying the coating, reinforcement and sheath to the core tube.

As shown in FIG. 2, core tube 11 may be coated by passing from a storage reel 18 through a tank 19 containing a water solution of vinylidene chloride polymer at room temperature and preferably at a speed such that a coating 12 of between 0.0005 inch and 0.001 inch thickness is deposited upon the outer surface of the core tube. Variations of line speed and/or coating mechanism can, of course, provide a thicker or thinner coating, as desired. The coated core tube is then passed through a heater 20 such that the volatile portion of the vinylidene chloride polymer solution is driven off and so that the remaining solid material forms a continuous and uniform coating 12 over the outer surface of the core tube. The heating conditions and line speeds are dictated by the nature of the vinylidene chloride polymer coating (latex, lacquer, organisol, etc.), the specific solids content and the coating thickness desired. The coated tube is then cooled and passed into a reservoir 23 that contains an adhesive, preferably a polyester isocyanate, at room temperature.

Upon emerging from reservoir 23, the coated tube with the adhesive 13 thereon is served with either a spiral or braided wrapping of fibrous reinforcing strands 13 such as Nylon, Dacron or the like, and tensioned so as to securely engage the vinylidene chloride polymer coated core tube. The coated core tube with the reinforcement thereon then passes through a reservoir or metering mechanism 25 for application to the reinforcement of epoxy or other adhesive and is then fed through an extruder cross-head 26 in which the sheath 16 is extruded over the reinforcement and adhered thereto by the epoxy or other adhesive on the reinforcement. The completed hose then passes into a water bath 28 for cooling and after which it is wound upon a storage reel 29.

Tests indicate that hoses having a vinylidene chloride polymer coated Nylon core tube have less than one third the permeability to water than hoses with uncoated Nylon and less than one tenth the permeability to water than uncoated rubber hose.

I claim:

1. A hose comprising a polyamide core tube, a coating of vinylidene chloride polymer on the outer surface of the core tube and adhered directly thereto, a layer of tensioned reinforcement strands from the class consisting of Nylon and Dacron over the vinylidene chloride polymer coating, and a sheath of flexible material from the class consisting of polyamide, polyester and polyurethane over the reinforcement, said coating being of approximately 0.0005 inch to 0.001 inch in thickness whereby there is substantially no embedment of the reinforcement in the coating.

2. The hose of claim 1 in which the reinforcement is bonded to the vinylidene chloride polymer coating by a polyester isocyanate adhesive and the sheath is bonded to the reinforcement by an amine cured epoxy.

3. The hose of claim 1 in which the reinforcement is bonded to the vinylidene coating by an adhesive consisting of polyester isocyanate.

4. The method of constructing a hose comprising furnishing a core tube of polyamide, applying a coating of vinylidene chloride polymer to the core tube, the coating being approximately in a range of 0.0005 inch to 0.001 inch in thickness, applying a polyester isocyanate adhesive to the coating, and applying a fibrous reinforcement from the class consisting of Nylon and Dacron over the coated tube to be adhered thereto by said adhesive, and applying a sheath of flexible material from the class consisting of polyamide, polyester and polyurethane over the reinforcement.

* * * * *